G. J. BRAGG.
BANANA PEELING MACHINE.
APPLICATION FILED JUNE 26, 1911.
1,093,762.
Patented Apr. 21, 1914.
2 SHEETS—SHEET 1.
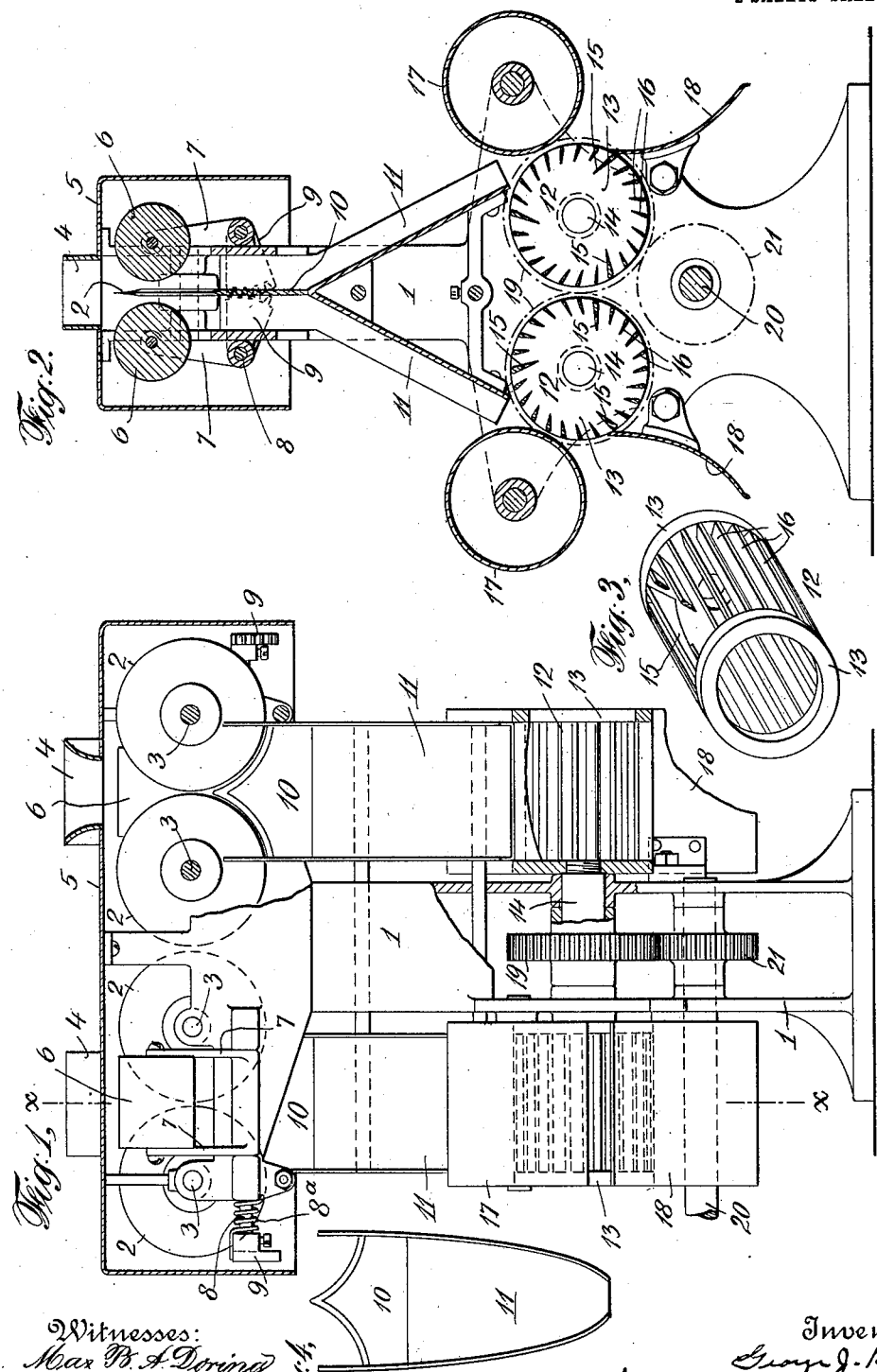

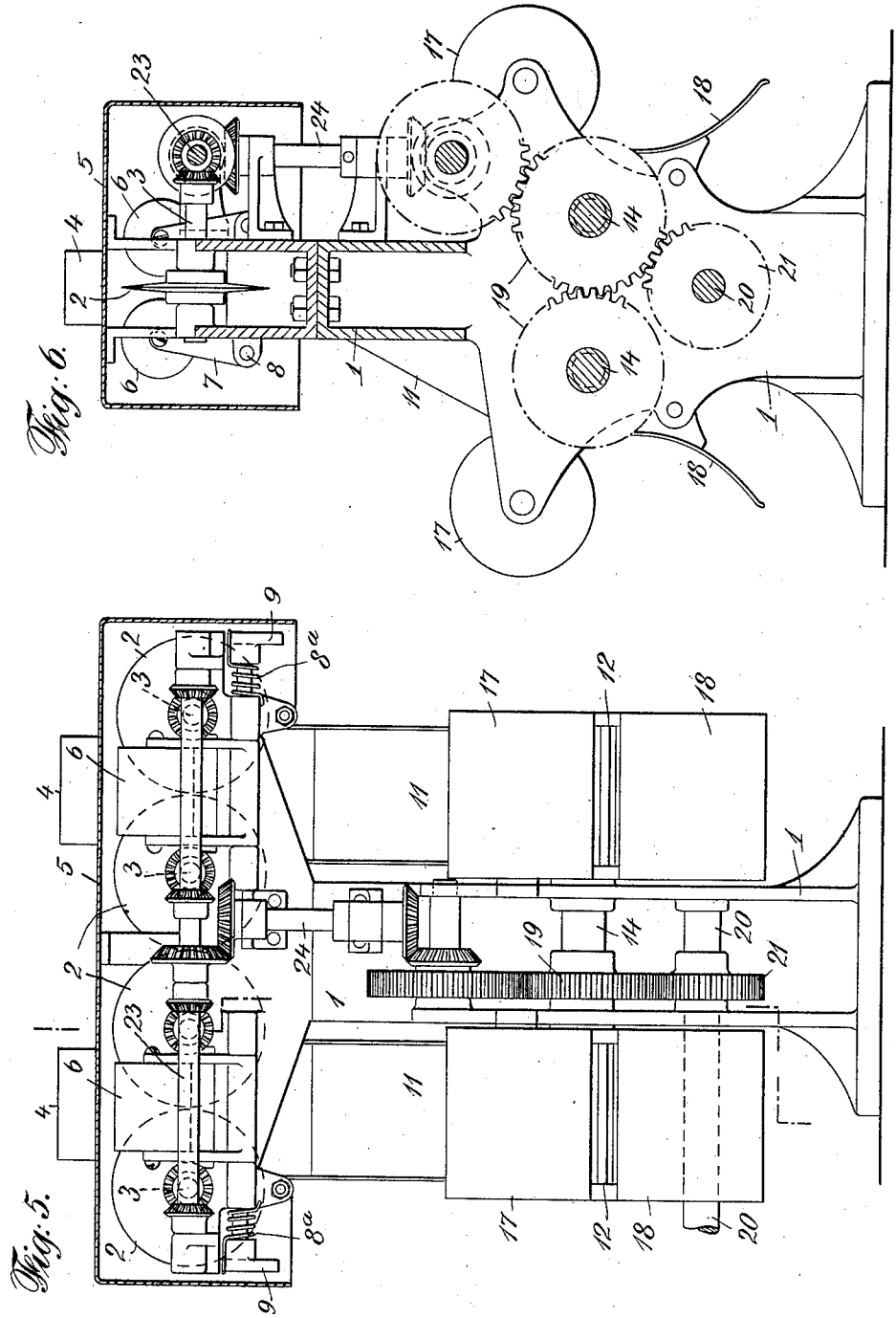

UNITED STATES PATENT OFFICE.

GEORGE J. BRAGG, OF PHILADELPHIA, PENNSYLVANIA.

BANANA-PEELING MACHINE.

1,093,762.            Specification of Letters Patent.    Patented Apr. 21, 1914.

Application filed June 26, 1911. Serial No. 635,289.

*To all whom it may concern:*

Be it known that I, GEORGE J. BRAGG, a citizen of the United States of America, and a resident of Philadelphia, county of Philadelphia, and State of Pennsylvania, have invented a certain new and useful Improvement in Banana-Peeling Machines, of which the following is a specification.

My invention relates to improvements in machines for splitting and peeling fruit, and is particularly applicable to the peeling of bananas and like fruit, and embodies improvements upon the machine for the same purpose set forth in my application for Letters Patent filed April 16, 1910, Sr. No. 555,941.

My invention consists in a novel structural arrangement of the parts of the machine and in a novel pulp-gathering head involving the use of blunt-edged knives which separate the pulp by an obtunding or squeezing action, rather than by a true cutting action.

The objects of my invention are to improve and simplify the construction and arrangement of the parts of machines such as referred to, to render such machines more compact and simple, and more easy and less expensive to construct, and to improve the pulp-gathering means of such machines to the end that complete separation of the pulp from the skin or peel may be obtained, without cutting of the skin, and without necessity for close adjustment of the parts.

I will now proceed to describe my invention with reference to the accompanying drawings, and will then point out the novel features in claims.

In the drawings: Figure 1 shows a side view and fragmentary vertical section of a double or twin machine embodying my invention, the section being taken on the central line of the machine; Fig. 2 shows a transverse vertical section of the machine on the line x—x of Fig. 1; Fig. 3 shows a perspective elevation, with parts of the knives broken away, of the pulp-gathering head; and Fig. 4 shows a detail elevation of the splitting device of the machine illustrating an alternative construction of trough thereof. Fig. 5 shows a detail side view of a machine similar to that shown in Fig. 1 except that it is provided with positive driving means for the rotary cutters; and Fig. 6 shows an end view of the parts shown in Fig. 5.

In the drawings, 1 designates the frame of the machine and 2, 2 designate rotary cutting disks mounted upon shafts 3. The machine shown being a twin machine, and two of these cutting disks being employed for each banana to be cut, there are four such disks, arranged in sets of two each, placed edge to edge and close together. Above each pair of cutting disks there is a feed chute 4 carried by the top plate 5 of the machine. Beside each pair of cutting disks 2 there are presser rollers 6 mounted to move toward and from said cutting disks; the particular construction whereby such rollers are permitted to move toward and from said disk, comprising pivoted arms 7 supporting said disks and springs 8$^a$ (Fig. 1) tending to press said arms toward the disks. The main function of the presser rollers 6 is to centralize the bananas so as to insure that each banana shall be cut approximately along its center line; wherefore some means for equalizing the motion of the two presser rollers is required; to which end the shafts 8 on which the arms 7 are mounted, are provided with intermeshing segmental gears 9.

Directly beneath and in the plane of each pair of cutting disks, there is a spreader 10 provided at its lower end with diverging troughs 11 extending obliquely downward, and each adapted to receive half of the cut banana and to deliver same by gravity to a pulp-gathering head, 12. These pulp-gathering heads are of skeleton construction, comprising end rings 13 mounted upon shafts 14 and connected by ribs 15 and inserted blades 16. The ribs themselves act as blades or knives, and their only difference from the knives proper is that said ribs are secured to the rings 13 so that said ribs and rings form a unitary structure, into which the knives 16 are inserted. These knives and ribs rake backward slightly from true radial position. In the machine illustrated and described in my above mentioned application Sr. No. 555,941, I employed pulp-gathering heads similarly constructed, except that the working edges of the knives and ribs were somewhat sharp. I have found that better results may be obtained by making the working edges of these knives and ribs quite blunt, so that these knives instead of having a true cutting action, act by squeezing or obtunding action. Such obtunding cutters of course separate the relatively soft pulp of the banana into small pieces, practically as readily as if they were sharp at their edges, while on the other hand such obtunding cutters do not cut the peel, but at the most merely compress or crease it.

To support the parts of the banana while the pulp-gathering heads are acting upon them, a rotary drum 17 is provided opposite each pulp-gathering head. Owing to the obtunding action of the knives of the pulp-gathering heads on the pulp, and the consequent non-cutting of the peel, close adjustment of the drums 17 in relation to the pulp-gathering heads is not required, thus permitting the machine to operate, without adjustment of these parts toward or from each other, notwithstanding considerable variation in thickness of skin.

Adjacent to each pulp-gathering head 12, and just beyond the corresponding drum 17, a peeling blade 18 is provided. These blades 18 act to strip off and separate the peels from the pulp-gathering heads 12.

The shafts 14 of the pulp-gathering heads are connected by gears 19 and are driven by a shaft 20 upon which is mounted a gear 21 intermeshing with one of the gears 19.

In general, it is not necessary to drive the rotary cutters 2 positively, the mere weight of the banana reinforced in some cases by a slight push, sufficing to pass it between the cutters and to cause rotation of such cutters. However, if desired, positive driving means for the cutters may be employed. In Figs. 5 and 6 one of the many suitable driving mechanisms is shown, comprising a shaft 23 gear-connected to the shafts 3 of the cutting disks, and driven by shaft 24, and suitable gears, from shafts 20.

The operation of this machine is as follows: Bananas, inserted one by one into the feed chutes 4, pass downward between the cutting disks 2, and are thereby slit into halves, which halves are separated by the spreaders 10 and pass down the chutes 11 endwise until engaged by the rotating pulp-gathering heads 12 and caused to pass between said pulp-gathering heads and the drum 17. In such passage, the pulp of the banana is squeezed into the spaces between the blades of the said heads, the peel remaining on the surface and being stripped off by the strippers or peeling blades 18. As new pulp enters between the blades of the pulp-gathering heads it forces into the interior of such heads pulp which may previously 'have occupied the same space, and thence the pulp passes out through the open ends of these heads. If desired, the sides of the chutes 11 may contract, as illustrated in Fig. 4, wherein 22 designates such contracting sides.

What I claim is:

1. A fruit peeling machine such as described, comprising in combination splitting means, a spreader in the line of movement of the fruit through such splitting means, diverging chutes extending outward from said spreading means, and pulp-gathering means receiving the split fruit from such chutes.

2. A fruit peeling machine such as described, comprising in combination splitting means, a spreader in the line of movement of the fruit through such splitting means, diverging chutes extending outward from said splitting means, and pulp-gathering means receiving the split fruit from such chutes, such pulp-gathering means comprising obtunding blades whereby the pulp is divided into pieces without cutting of the peel.

3. A fruit peeling machine such as described, comprising splitting means, diverging chutes arranged to receive the sections of the fruit split by said splitting means, and pulp-gathering means receiving the split fruit from such chutes.

4. A fruit peeling machine such as described, comprising splitting means, diverging chutes arranged to receive the sections of the fruit split by said splitting means, and a plurality of pulp-gathering means, one located in operative relation to each such chute, and arranged to separate the pulp of the fruit from the peel.

5. A fruit peeling machine such as described, comprising splitting means, diverging chutes arranged to receive the sections of the fruit split by said splitting means, a plurality of pulp-gathering means, one located in operative relation to each such chute, and arranged to separate the pulp of the fruit from the peel, a driving member, and means driven thereby for driving said pulp-gathering means.

6. A pulp-gathering head for banana peeling machines such as described, comprising a plurality of obtunding blades arranged longitudinally with respect to a common axis, and closely related and supporting means therefor, the working edges of such blades having such bluntness that they separate the pulp of the banana by squeezing as distinguished from cutting, and do not cut the peel.

7. A pulp-gathering head for banana peeling machines such as described, comprising a plurality of blunt-edged blades arranged longitudinally with respect to a common axis, and closely related and supporting means therefor, the working edges of such blades having such bluntness that they separate the pulp of the banana by squeezing as distinguished from cutting, and do not cut the peel.

8. A banana peeling machine such as described, comprising the combination with a hollow rotary pulp-gathering head, comprising a plurality of blunt-edged blades arranged longitudinally about a common axis and spaced away therefrom, there being a space for receiving the cut pulp in the interior of the drum formed by such blades, such drum being open at one end for the escape of the pulp, of means for splitting bananas and for feeding the split fruit to such cutting head, and means for supporting the split fruit during the action of the cutting head thereon.

In testimony whereof I have signed this specification in the presence of two subscribing witnesses.

GEORGE J. BRAGG.

Witnesses:
H. M. MARBLE,
D. A. DAVIES.

Copies of this patent may be obtained for five cents each, by addressing the "Commissioner of Patents, Washington, D. C."